United States Patent Office 3,179,600
Patented Apr. 20, 1965

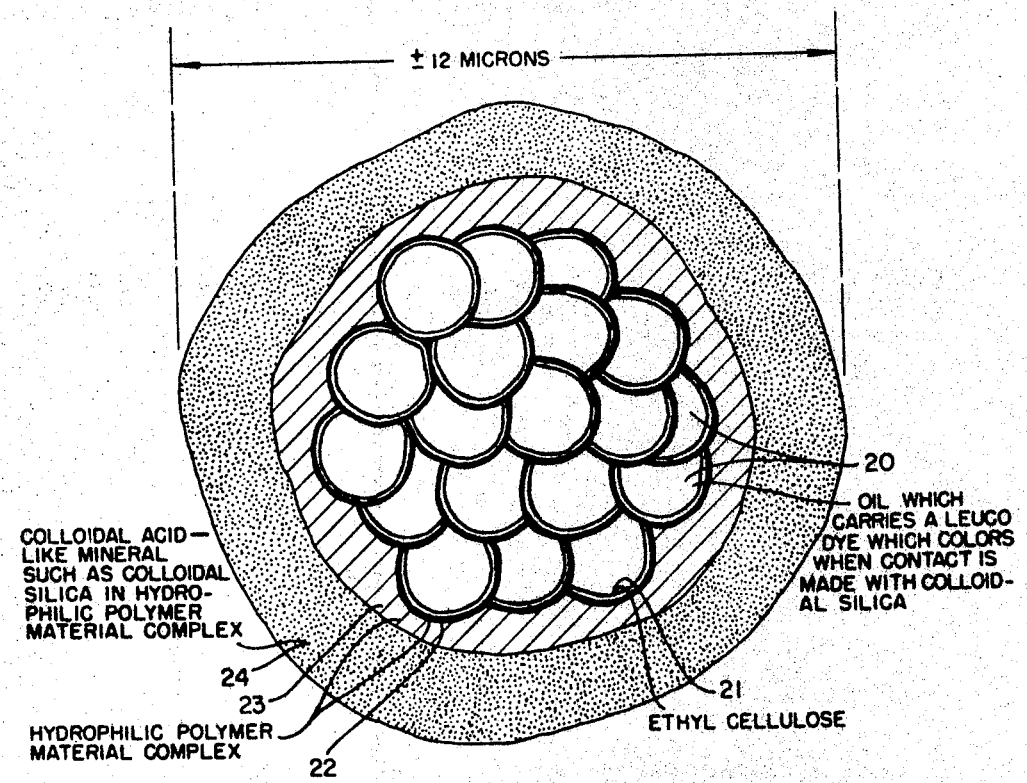
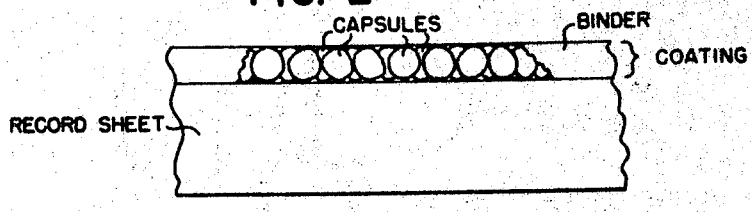

3,179,600
MINUTE COLOR-FORMING CAPSULES AND RECORD MATERIAL PROVIDED WITH SUCH
Bruce W. Brockett, Dayton, Ohio, assignor to The National Cash Register Company, Dayton, Ohio, a corporation of Maryland
Filed Mar. 10, 1960, Ser. No. 14,011
9 Claims. (Cl. 252—188.3)

This invention relates to an intra-reactive minute capsule containing chemical reactants separated in a novel manner and to material provided with a coating of such capsules, and more particularly, but not exclusively, pertains to an over-coated integral capsule containing a centrally-disposed liquid which combines with the material of the over-coating, when the capsule is ruptured, to form a distinctive color, such capsules being particularly useful, when used in profusion on or in record material sheets, there to produce colored marks by rupture of the capsules in selected areas of such sheets.

It is contemplated that the capsule rupture may be brought about by any forceful means such as crushing or piercing, pressure, freezing, heat, explosion, implosion, sound vibration, or electrical energy in radiant or non-radiant form.

By the term "minute" is meant that the capsules are of a size so small as to require the manufacture of them en masse instead of individually, including those of several millimeters in largest dimension to those of several microns in largest dimension.

Each of the capsules, which form part of the subject matter of the invention, consists of a rigid wall of film-forming polymeric material surrounding and locking up one or more droplets of water-immiscible material comprising or containing one or more chemical reactants, and having a coating associated with and adherent to the outside of the capsule wall preferably consisting of one or more colloid sized solid discrete particles of acid-like materials reactant with the liquid-carried reactant material but separated from physical contact with said reactant material by the capsule wall until the capsule wall is ruptured in any manner. By such capsule wall rupture, the reactant materials of the liquid and the particles of the outside over-coating are brought together by reason of the mobility of the released material which flows, it being liquid.

The invention will be described with respect to a preferred and other embodiments, but its scope is not to be limited to the materials used in such embodiments, as it is to be deemed broadly encompassing other materials, as will be evident from the specification to follow, including the drawing.

Of the drawing:
FIG. 1 is a greatly enlarged diagrammatical showing of a single capsule entity, and
FIG. 2 is a greatly enlarged diagrammatical showing of a record sheet, partly in section, of a profusion of such capsules adhered to a sheet of record material.

In the preferred embodiment of the invention, which will be given in Example I, the capsule wall is of hydrophilic polymeric material, in part natural polymeric material, and in part artificial polymeric material forming various polymeric molecular complexes. These polymeric material complexes, when solvated or dissolved at temperatures substantially above room temperature, are liquid but set to a firm condition at room temperature, so that, in the manufacture of the capsules in a warm aqueous medium, the walls of the capsules will first form as a liquid and then be set to said firm condition upon the temperature's being lowered to substantially room temperature or below.

The capsules are formed in an aqueous medium into which the capsule materials are introduced and in which they are treated, first to form liquid-walled liquid-containing capsules, then to set their walls to a firm condition, and finally to coat the capsules. The aqueous vehicle and added capsule compositions are continuously agitated during the addition of various pH-controlling materials to cause the formation of the capsules, and the temperature is maintained at substantially above room temperature to keep the capsule components liquid until the capsule walls are formed. The liquid capsule walls then are set to a firm condition by lowering the temperature of the system to below room temperature, after which the outer coating is applied to the walls, and the capsules are hardened.

EXAMPLE I

First, the water-immiscible liquid capsule nucleus material is made in a separate vessel, and in this example 152 grams of trichlorodiphenyl and 1.6 grams of low-viscosity ethyl cellulose (such an ethyl cellulose having an ethoxyl content of 47.5 percent, by weight, and a viscosity of 4 centipoises when dispersed dry in a 5 percent, by weight, concentration in an 80/20 toluene-ethanol bath at 25 degrees centigrade) are heated to 220 degrees Fahrenheit, and, after the mixture is cooled to 200 degrees Fahrenheit, there are added to and dissolved in the mixture 5 grams of crystal violet lactone, which is 3,3-bis-(p-dimethylaminophenyl)-6-dimethylamino phthalide, and 3 grams of benzoyl leuco methylene blue. This is the material which forms the liquid droplets to be held in the completed capsules, and will be termed, for the purposes of this example, the internal phase of the capsules, as the droplets are formed as the internal phase of an emulsion. This internal phase is set aside until used in the next step. In this next step, in a separate vessel, there is formed a solution of 40 grams of porkskin gelatin, having its iso-electric point approximately at pH 8, in 320 grams of water. To this is added 25 grams of a 2 percent, by weight, aqueous solution of polyethylenemaleic anhydride, and the whole aqueous system is adjusted to 140 degrees Fahrenheit. The internal phase is poured into this aqueous mixture, and the system then is adjusted to about pH 7. The internal phase is emulsified into the aqueous medium and contents until the drop size of the internal phase liquid is of the order of 1 to 2 microns. Now that the emulsion is formed, the pH of the aqueous vehicle and contents is raised to 9, and there is added to the system 26 grams of gum arabic dissolved in 212 grams of water, keeping the pH adjusted to 9 and the system heated and in constant agitation. Next there is added 1740 grams of water, the system being kept heated to 140 degrees Fahrenheit, at which time the condition of the system is gradually changed to cause the formation of complex coacervate entities by lowering the pH of the system over a period of ten minutes to 4.5, as by the addition of an aqueous solution of acetic acid. As the pH of the system is being lowered, coacervate complex polymeric entities are forming, the first entities forming deposits around the droplets of water-immiscible internal phase individually, after which the coated droplets tend to cluster into small botryoid units. Upon continued lowering of the pH and the formation of more complex coacervate entities of different polymer fractions, these botryoid units individually are coated with a surrounding wall of complex coacervate polymeric material, the polymeric material depositions at this point still being in liquid form. If the coacervation is not to be performed immediately the emulsion is first made, an emulsion stabilizer is used to prevent coalescence of the emulsion droplets until it is desired that the coacervation be initiated. With continued agitation, the system is rapidly cooled, over a period of a half-hour at the maximum, to 55 degrees Fahrenheit to cause the deposited complex polymeric material to set to a firm condition. To allow most of the residual undeposited colloid complex polymeric material entities to deposit, the system is allowed to stay under agitation at said 55-degree-Fahrenheit temperature for approximately one half-hour. The capsules are now ready for the application of the outer coating of color-reactive material, which in this example is substantially colorless or white. Maintaining the agitation and the temperature of 55 degrees Fahrenheit, there is added to the system 230 grams of an aqueous dispersion of colloidal silica, said dispersion being 35 percent solids and the particle size averaging 16–22 millimicrons. During the ensuing ten minutes or more of continued agitation of the system, the particles of colloidal silica will commence to deposit upon the outside of each of the solidified walls of the capsules as discrete entities, carrying with it any remaining polymeric complex material. The deposition continues until the deposit around each capsule is up to approximately two microns in thickness, such deposition automatically ceasing due to an equilibrium being reached in surface forces acting between the silica particles and the capsule wall material. The capsules then are hardened by addition of 20 grams of a 25 percent, by weight, aqueous glutaraldehyde solution, which hardening is completed by continued agitation of the system for several hours or more.

The ethyl cellulose, when it comes into contact with water or material containing such comes out of solution and forms a film at the interface, and this film remains between the deposited complex polymer and the enclosed liquid droplets, thus sealing the gel-structure pores against migration of the droplet liquid therethrough should the water be removed from around the capsules.

FIG. 1 is, as has been mentioned, a diagrammatical showing of one of the capsule units in the range of 12 microns in diameter. No cross section is feasible or necessary, because under the microscope these units in the unruptured form are more or less transparent. The shadings in FIG. 1 are unconventional, and the elements are not actually to scale, the shadings being shown merely to indicate different parts of the unit, which is irregularly spherical. The oil droplets 20 are the mentioned water-immiscible liquid droplets containing the dissolved leuco dyes, which in the preferred example are crystal violet lactone and benzoyl leuco methylene blue. There are many equivalent leuco dyes which react with acid-like minerals in the manner of crystal violet lactone, among which are malachite green lactone, which produces a green color; rhodamine-B-lactam, which produces a reddish color; o-hydroxy-benzalacetophenone, which produces a yellowish-red color; and many others disclosed in United States Patent No. 2,505,470 and in United States Patents Nos. 2,505,472 to 2,505,480 inclusive, which issued on applications of Barrett K. Green. Other acid-like minerals than the preferred colloidal silica are kaolin, bentonite, attapulgite, and halloysite. Continuing to describe FIG. 1, the ethyl cellulose film 21 is shown as an interface between each droplet and the first layer 22 of hydrophilic polymer complex material deposited there-around. The enshrouding layer 23 of polymeric complex material is of different molecular weight, but the two compositions contain the same complex components in different combinations of molecular weight. The colloidal-mineral-polymer outer coating 24 is mostly mineral with a small amount of complex polymeric material carried onto the capsule therewith, the amount of stippling in the drawing not evidencing the preponderance of the mineral content thereof.

These capsules represent about 11.5 percent, by weight, of the system, the remainder being the residual water containing a small remnant of unused capsule-forming material, such residual water and contents being decanted, in part, prior to use of the capsules as a coating for record material.

The remaining capsules may have added thereto a minimal amount of paper-coating binder and be applied as a coating to a paper surface, so that the coating, when dry, amounts to about ten pounds per ream of 25 by 38 inches per sheet. FIG. 2 shows such a coated record sheet as having the capsules in a one-capsule-thick layer, but in actuality the coating thickness compared to the capsule size would give a coating at least several capsules thick.

EXAMPLE II

The same procedural steps are used in this example, except that the hardening agent is introduced prior to the introduction of the colloidal mineral material, such being desirable in large-scale operations where it is desired not to dirty the coacervation tanks with the colloidal minerals. In large-scale production, the system is transferred to a separate tank, where the colloidal minerals are added and deposited on the capsules undergoing hardening, the polymeric material depositing with the colloidal minerals also hardening in the transfer tank.

General considerations

The whole purpose of the invention, in its preferred form, is to provide a minute or microscopic capsule entity that when crushed or otherwise ruptured, as by internal forces, changes from a substantially colorless body to a distinctively-colored body, and this is achieved by locking up a fluid which is or contains one of two color reactants in a rupturable wall, or membrane, which, in addition to retaining the fluid until it is broken, has on its outer surface the other of the two reactants in minute discrete particle form, insuring that the two reactants will join to produce a color if only one capsule is ruptured. In a paper coating, this minutely controlled color formation insures localization of produced color by applied marking forces, and, in the preferred embodiment, employing ethyl cellulose, insures the maximum protection against premature coloration of a capsular unit because of wall membrane penetration of the fluid material. The thick polymeric material wall around the individually-walled droplets is an added safeguard in the foregoing respect.

The invention is not to be deemed limited to the particular type of capsular structure disclosed as preferable, as the deposit of colloidal mineral may be made on single droplet capsules such as those disclosed in United States Patents Nos. 2,800,457, to Barrett K. Green et al., and 2,800,458, to Barrett K. Green; and as disclosed in application for United States Letters Patent Serial No. 784,020, filed December 31, 1958, by Carl Brynko and Joseph A. Scarpelli. These references also disclose materials which may be used in place of the polymeric materials set forth herein. In all of these patents and in the application, the capsule walls are formed of coacervate deposits of hydrophilic film-forming polymeric material, which, after deposition in the aqueous medium, carry positive charges which can attract predominately negatively charged colloidal mineral particles such as will cause color formation in the suggested leuco dyes in the liquid interior of the capsules, provided that the pH of the system in which these capsules are dispersed is maintained in the coacervation range which is under pH 6. Gas-producing agents may be incorporated in the capsules to cause them to rupture on heating, as disclosed in application for United States Letters Patent Serial No. 769,058, filed October 23, 1958, by Herman J. Eichel. Such heat-rupturable capsules having the novel features of this invention might be used as devices to evidence the over-heating of a material, such as thermoplastics and other heat-sensitive substances.

It will be evident that other than color-forming reactants can be used, as, indeed, the color formed is due to a change in light absorption, the color being only subjectively sensed by the eye. The invention, therefore, goes to chemical reactants per se, whether color is formed or not, and, therefore, the invention will be broadly claimed without reference to color.

What is claimed is:

1. A process for making minute capsular entities an masse, each entity consisting of a nucleus of liquid water-immiscible material which is a first one of two chemical reactants that react upon contact, the liquid nucleus being retained in a rupturable wall of hydrophilic film-forming polymeric material, and the second of the two reactants being deposited as a shell on the outside of the wall, which wall when intact insulates the reactants from physical contact, including the steps of preparing a warm aqueous solution of film-forming hydrophilic polymeric materials, said materials having fractions which form solidifiable molecular complexes in stages if the pH of the solution is changed acid-wise, and said solution having the liquid nucleus material dispersed therein as minute droplets and kept so by agitation of the system; changing the pH of the system acid-wise to a degree to cause formation of liquid complex entities of a portion of the polymeric material fractions, such complex entities depositing around each of the droplets as liquid walls, and keeping such walled entities agitating in the remaining aqueous solution until clusters of such liquid-walled entities form to the desired size; thereafter changing the pH of the system further acid-wise to form more complex entities of the remaining polymeric material which deposit around the clusters individually to form liquid-walled clusters, the wall material now having a positive charge; still with agitation, chilling the clusters to where the wall material sets to a firm condition; and introducing into the system small particles of solid mineral which is reactive with the nucleus material, which particles are negatively charged and are attracted to the positively charged material of the walls of the clusters to deposit thereon and form an enveloping adherent shell about each cluster wall by reason of the different charge forces.

2. The process of claim 1 in which the set polymeric material includes gelatin and is hardened by addition to the system of a hardening agent for gelatin.

3. The process of claim 1 in which the nucleus droplets originally have included therein in solution a small amount of ethyl cellulose which forms an impermeable film between the nucleus liquid and the capsule wall material by reason of its water insolubility.

4. The process of making minute capsules, each having retained within its walls a reactant liquid which reacts with a solid shell on the outside of the capsule on contact therewith, including the steps of forming a diluted aqueous dispersion of gellable film-forming hydrophilic polymeric material in which is emulsified a water-immiscible liquid material carrying a reactant; causing coacervation of the polymeric material, which coacervated polymeric material deposits on the droplets of liquid material; gelling the deposits of polymeric material to form capsules; and introducing into the system, with agitation and while the system is in coacervation condition in which the polymeric material has a positive charge, particulate solid reactant material entities having a negative charge and which because of unlike charges are attracted to, deposit on, and form an adherent enveloping shell about the polymeric material capsule walls.

5. A minute intra-reactive capsule having within itself a nucleus of water-immiscible liquid which constitutes one of two chemical reactants which can react on contact; a rupturable wall of hydrophilic polymeric material enclosing and retaining the nucleus material; and an outer shell of a profusion of minute discrete solid particles of the other chemical reactant material enveloping and attracted to and adherent to the wall of polymeric material by reason of a difference in polar charge, said wall physically separating the reactants until the wall is ruptured, and, upon rupture, allowing the liquid reactant to contact the solid particulate reactant material of the shell to react therewith.

6. A minute intra-reactive capsule having within itself a nucleus of water-immiscible dye-containing liquid; a rupturable wall of hydrophilic polymeric material surrounding and retaining the nucleus material; and an outer enveloping shell of micro-fine discrete particles of reactant material surrounding, attracted to, and adherent to the polymeric material of the rupturable wall by reason of a difference in polar charge, said wall physically keeping the nucleus liquid from contact with the reactant material until the wall is ruptured, and said liquid upon rupture of the wall reacting with the particulate material of the shell to produce a distinctive color thereon.

7. Record material having a surface thereof coated with a profusion of minute capsules, each of which capsules in and of itself being intra-reactive and producing a tiny spot of color when crushed and which spot is visible with the remainder of the coated surface as a background, each capsule consisting of a wall of crushable polymeric film-forming material which, until crushed, retains a liquid, and an outer shell of particulate material enveloping the wall attracted and held thereto by a difference in polar charge which material is reactant with the retained liquid in its capsule and with liquid released from neighboring capsules coming in contact therewith to produce a distinctive color, whereby a marking instrument applied to the record material surface with capsule-crushing force will leave a distinctively colored mark where such force is applied to one or more capsules and the liquid contacts the shell of the capsules.

8. A paper sheet having a surface thereof coated with a profusion of minute capsules, each of which capsules is rupturable by a marking instrument applied thereto with pressure, each individual capsule consisting of a wall of crushable polymeric film-forming material within which is retained a liquid color-reactant and each capsule having an outer shell of particulate solid matter surrounding and enveloping the wall and being attracted thereto and adhering thereto by reason of a difference in polar charge, which particulate material is reactant with the retained liquid or liquid from neighboring capsules, on contact therewith, to produce a distinctive color, whereby a marking instrument when applied with capsule-rupturing force to desired areas of the record material will leave corresponding distinctively colored capsule shells.

9. A record material sheet having at least one surface thereof coated with a profusion of minute capsules, each of which capsules is rupturable by a marking instrument applied thereto with pressure, each individual capsule consisting of a wall of crushable polymeric film-forming material within which is retained a liquid color-reactant and each capsule having an outer shell surrounding and enveloping the wall and including particulate solid matter attracted to and adhering to the wall material by a difference in polar charge, said particulate material being reactant with the retained liquid or reactant liquid supplied from without the capsule, on contact therewith, to produce a distinctive color, whereby a marking instrument when applied with capsule-rupturing force to desired areas of the record material will leave corresponding distinctively colored marks on the particulate material of the shells.

References Cited by the Examiner

UNITED STATES PATENTS

| | | | |
|---|---|---|---|
| 871,612 | 11/07 | Nesfield. | |
| 2,333,283 | 11/43 | Wilson | 106—197 |
| 2,730,457 | 1/56 | Green et al. | 117—36 |
| 2,800,458 | 7/57 | Green | 252—1 XR |
| 2,886,445 | 5/59 | Rosenthal et al. | 167—82 |
| 2,929,736 | 3/60 | Miller et al. | 117—36 |
| 2,991,226 | 7/61 | Millar et al. | 167—83 XR |
| 3,041,289 | 6/62 | Katchen et al. | 252—316 |

FOREIGN PATENTS 70,303  11/58  France.
(Addition to 1,090,910)

OTHER REFERENCES

"N.R.C." Capsules Have Wide Possibilities, 3 pages, The N.C.R. Factory News, October 1959, pub. by National Cash Register Co., Dayton, Ohio.

JULIUS GREENWALD, *Primary Examiner.*